United States Patent
Hines et al.

(10) Patent No.: US 7,426,380 B2
(45) Date of Patent: *Sep. 16, 2008

(54) LOCATION DERIVED PRESENCE INFORMATION

(75) Inventors: Gordon John Hines, Kirkland, WA (US); Mario G. Tapia, Seattle, WA (US); Will Cousins, Seattle, WA (US); Patrick Carey, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 251 days.

This patent is subject to a terminal disclaimer.

(21) Appl. No.: 10/395,217

(22) Filed: Mar. 25, 2003

(65) Prior Publication Data

US 2004/0203922 A1 Oct. 14, 2004

Related U.S. Application Data

(60) Provisional application No. 60/367,708, filed on Mar. 28, 2002.

(51) Int. Cl.
*H04M 3/42* (2006.01)
*H04M 11/04* (2006.01)
*H04Q 7/20* (2006.01)

(52) U.S. Cl. .............................. 455/404.2; 342/357.06; 342/357.09; 455/414.2; 455/435.1; 455/456.3

(58) Field of Classification Search ... 455/456.1–456.3, 455/457, 11.1, 410, 411, 404.2, 414.2, 435.1, 455/461; 342/357.01, 357.06, 357.09, 357.13
See application file for complete search history.

(56) References Cited

U.S. PATENT DOCUMENTS

| | | | |
|---|---|---|---|
| 1,103,073 A | 7/1914 | O'Connel | |
| 4,445,118 A | 4/1984 | Taylor et al. | |
| 4,494,119 A | 1/1985 | Wimbush | |
| 4,651,156 A | 3/1987 | Martinez | |
| 4,706,275 A | 11/1987 | Kamil | |
| 4,891,638 A | 1/1990 | Davis | |
| 4,891,650 A | 1/1990 | Sheffer | |

(Continued)

FOREIGN PATENT DOCUMENTS

WO WO9921380 4/1999

(Continued)

OTHER PUBLICATIONS

International Search Report in PCT/US2007/23243 dated Apr. 2, 2008.

(Continued)

*Primary Examiner*—Harry S. Hong
(74) *Attorney, Agent, or Firm*—William H. Bollman

(57) ABSTRACT

The number of messages required in networks where both location and presence services are deployed may be reduced, by retrieving presence data from messages otherwise intended to provide only location information. Thus, information determined in a location service scheme is utilized to provide a presence service as well. A location server requests mobile subscriber (MS) information from a Core Network (CN) Node (i.e. HLR, MSC, etc.) that can be used in determining the Location of the MS. A single message aggregates retrieval of information for two services, specifically, for both location and presence.

20 Claims, 2 Drawing Sheets

U.S. PATENT DOCUMENTS

| | | |
|---|---|---|
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimullah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,399 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | Dennison |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van De Kerkhof |
| 5,682,600 A | 10/1997 | Salin |
| 5,689,245 A | 11/1997 | Noreen |
| 5,699,053 A | 12/1997 | Jonsson |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |
| 5,930,250 A | 7/1999 | Klok |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithil et al. |
| 6,032,051 A | 2/2000 | Hall |

| Patent | Date | Name | | Patent | Date | Name |
|---|---|---|---|---|---|---|
| 6,035,025 A | 3/2000 | Hanson | | 6,330,454 B1 * | 12/2001 | Verdonk .................. 455/456.2 |
| 6,049,710 A | 4/2000 | Nilsson | | 6,333,919 B2 | 12/2001 | Gaffney |
| 6,052,081 A | 4/2000 | Krasner | | 6,360,093 B1 | 3/2002 | Ross |
| 6,058,338 A | 4/2000 | Krasner | | 6,363,254 B1 | 3/2002 | Jones |
| 6,058,300 A | 5/2000 | Hanson | | 6,367,019 B1 | 4/2002 | Ansell |
| 6,061,018 A | 5/2000 | Sheynblat | | 6,370,389 B1 | 4/2002 | Isomursu |
| 6,061,346 A | 5/2000 | Nordman | | 6,377,209 B1 | 4/2002 | Krasner |
| 6,064,336 A | 5/2000 | Krasner | | 6,377,810 B1 * | 4/2002 | Geiger et al. ............ 455/456.2 |
| 6,064,875 A | 5/2000 | Morgan | | 6,400,314 B1 | 6/2002 | Krasner |
| 6,067,045 A | 5/2000 | Castelloe | | 6,400,958 B1 | 6/2002 | Isomursu |
| 6,070,067 A | 5/2000 | Nguyen | | 6,411,254 B1 | 6/2002 | Moeglein |
| 6,075,982 A | 6/2000 | Donovan | | 6,421,002 B2 | 7/2002 | Krasner |
| 6,081,229 A | 6/2000 | Soliman | | 6,433,734 B1 | 8/2002 | Krasner |
| 6,081,508 A | 6/2000 | West | | 6,434,381 B1 | 8/2002 | Moore |
| 6,085,320 A | 7/2000 | Kaliski, Jr. | | 6,442,391 B1 | 8/2002 | Johansson |
| 6,101,378 A | 8/2000 | Barabash | | 6,449,473 B1 | 9/2002 | Raivisto |
| 6,104,931 A | 8/2000 | Havinis et al. | | 6,449,476 B1 | 9/2002 | Hutchison, IV |
| 6,122,503 A | 9/2000 | Daly | | 6,456,852 B2 | 9/2002 | Bar |
| 6,122,520 A | 9/2000 | Want | | 6,463,272 B1 | 10/2002 | Wallace |
| 6,124,810 A | 9/2000 | Segal | | 6,477,150 B1 | 11/2002 | Maggenti |
| 6,131,067 A | 10/2000 | Girerd | | 6,504,491 B1 | 1/2003 | Christians |
| 6,133,874 A | 10/2000 | Krasner | | 6,505,049 B1 | 1/2003 | Dorenbosch |
| 6,134,483 A | 10/2000 | Vayanos | | 6,510,387 B2 | 1/2003 | Fuchs |
| 6,138,003 A * | 10/2000 | Kingdon et al. ............. 455/410 | | 6,512,922 B1 | 1/2003 | Burg |
| 6,148,197 A | 11/2000 | Bridges | | 6,512,930 B2 | 1/2003 | Sandegren |
| 6,148,198 A | 11/2000 | Anderson | | 6,515,623 B2 | 2/2003 | Johnson |
| 6,149,353 A | 11/2000 | Nilsson | | 6,519,466 B2 | 2/2003 | Pande |
| 6,150,980 A | 11/2000 | Krasner | | 6,522,682 B1 | 2/2003 | Kohli |
| 6,154,172 A | 11/2000 | Piccionelli | | 6,529,829 B2 | 3/2003 | Turetzky |
| 6,169,891 B1 | 1/2001 | Gorham | | 6,531,982 B1 | 3/2003 | White |
| 6,169,901 B1 | 1/2001 | Boucher | | 6,538,757 B1 | 3/2003 | Sansone |
| 6,169,902 B1 | 1/2001 | Kawamoto | | 6,539,200 B1 | 3/2003 | Schiff |
| 6,173,181 B1 | 1/2001 | Losh | | 6,539,232 B2 | 3/2003 | Hendrey et al. |
| 6,178,505 B1 | 1/2001 | Schneider | | 6,539,304 B1 | 3/2003 | Chansarkar |
| 6,178,506 B1 | 1/2001 | Quick, Jr. | | 6,542,464 B1 | 4/2003 | Takeda |
| 6,181,935 B1 | 1/2001 | Gossman | | 6,542,734 B1 | 4/2003 | Abrol |
| 6,185,427 B1 | 2/2001 | Krasner et al. | | 6,542,743 B1 | 4/2003 | Soliman |
| 6,188,354 B1 | 2/2001 | Soliman | | 6,549,776 B1 | 4/2003 | Joong |
| 6,188,752 B1 | 2/2001 | Lesley | | 6,549,844 B1 | 4/2003 | Egberts |
| 6,188,909 B1 | 2/2001 | Alanara | | 6,553,236 B1 | 4/2003 | Dunko et al. |
| 6,189,098 B1 | 2/2001 | Kaliski, Jr. | | 6,556,832 B1 | 4/2003 | Soliman |
| 6,195,557 B1 | 2/2001 | Havinis | | 6,560,461 B1 | 5/2003 | Fomukong |
| 6,198,431 B1 | 3/2001 | Gibson | | 6,560,534 B2 | 5/2003 | Abraham |
| 6,199,045 B1 | 3/2001 | Giniger | | 6,570,530 B2 | 5/2003 | Gaal |
| 6,199,113 B1 | 3/2001 | Alegre | | 6,571,095 B1 | 5/2003 | Koodli |
| 6,205,330 B1 | 3/2001 | Winbladh | | 6,574,558 B2 | 6/2003 | Kohli |
| 6,208,290 B1 | 3/2001 | Krasner | | 6,580,390 B1 | 6/2003 | Hay |
| 6,208,854 B1 | 3/2001 | Roberts | | 6,584,552 B1 | 6/2003 | Kuno |
| 6,215,441 B1 | 4/2001 | Moeglein | | 6,587,691 B1 * | 7/2003 | Granstam et al. ............ 455/457 |
| 6,219,557 B1 | 4/2001 | Havinis | | 6,594,500 B2 | 7/2003 | Bender |
| 6,223,046 B1 | 4/2001 | Hamill-Keays | | 6,597,311 B2 | 7/2003 | Sheynblat |
| 6,226,529 B1 | 5/2001 | Bruno | | 6,603,973 B1 | 8/2003 | Foladare |
| 6,239,742 B1 | 5/2001 | Krasner | | 6,606,495 B1 | 8/2003 | Korpi |
| 6,247,135 B1 | 6/2001 | Feague | | 6,606,554 B2 | 8/2003 | Edge |
| 6,249,680 B1 | 6/2001 | Wax | | 6,609,004 B1 | 8/2003 | Morse |
| 6,249,744 B1 | 6/2001 | Morita | | 6,611,757 B2 | 8/2003 | Brodie |
| 6,249,873 B1 | 6/2001 | Richard | | 6,618,593 B1 | 9/2003 | Drutman et al. |
| 6,253,203 B1 | 6/2001 | O'Flaherty | | 6,618,670 B1 | 9/2003 | Chansarkar |
| 6,260,147 B1 | 7/2001 | Quick, Jr. | | 6,621,452 B2 | 9/2003 | Knockeart |
| 6,266,614 B1 | 7/2001 | Alumbaugh | | 6,628,233 B2 | 9/2003 | Knockeart |
| 6,275,692 B1 | 8/2001 | Skog | | 6,633,255 B2 | 10/2003 | Krasner |
| 6,275,849 B1 | 8/2001 | Ludwig | | 6,640,184 B1 | 10/2003 | Rabe |
| 6,289,373 B1 | 9/2001 | Dezonno | | 6,650,288 B1 | 11/2003 | Pitt |
| 6,297,768 B1 | 10/2001 | Allen, Jr. | | 6,661,372 B1 | 12/2003 | Girerd |
| 6,307,504 B1 | 10/2001 | Sheynblat | | 6,665,539 B2 | 12/2003 | Sih |
| 6,308,269 B2 | 10/2001 | Proidl | | 6,665,541 B1 | 12/2003 | Krasner |
| 6,313,786 B1 | 11/2001 | Sheynblat | | 6,671,620 B1 | 12/2003 | Garin |
| 6,317,594 B1 | 11/2001 | Gossman | | 6,677,894 B2 | 1/2004 | Sheynblat |
| 6,321,091 B1 | 11/2001 | Holland | | 6,680,694 B1 | 1/2004 | Knockeart |
| 6,321,257 B1 | 11/2001 | Kotala | | 6,691,019 B2 | 2/2004 | Seeley |
| 6,324,542 B1 | 11/2001 | Lent | | 6,694,258 B2 | 2/2004 | Johnson |
| 6,327,473 B1 | 12/2001 | Soliman | | 6,697,629 B1 | 2/2004 | Grilli |
| 6,327,479 B1 | 12/2001 | Mikkola | | 6,698,195 B1 | 3/2004 | Hellinger |

| | | |
|---|---|---|
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 * | 6/2004 | Nowak et al. ............ 455/456.2 |
| 6,771,742 B2 | 8/2004 | McCalmont |
| 6,771,971 B2 * | 8/2004 | Smith ..................... 455/456.1 |
| 6,772,340 B1 | 8/2004 | Peinado |
| 6,775,255 B1 | 8/2004 | Roy |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Kogan |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,842,715 B1 | 1/2005 | Gaal |
| 6,847,822 B1 | 1/2005 | Dennison |
| 6,853,916 B2 | 2/2005 | Fuchs et al. |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell et al. |
| 6,885,874 B2 | 4/2005 | Grube et al. |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,950 B2 | 9/2005 | Dickinson et al. |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,136,838 B1 | 11/2006 | Peinado |
| 7,151,946 B2 | 12/2006 | Maggenti |
| 7,209,758 B1 | 4/2007 | Moll |
| 7,209,969 B2 | 4/2007 | Lahti |
| 7,218,940 B2 | 5/2007 | Niemenmaa |
| 7,221,959 B2 | 5/2007 | Lindqvist |
| 2001/0011247 A1 | 8/2001 | O'Flaherty |
| 2001/0021646 A1 | 9/2001 | Antonucci et al. |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0098832 A1 | 7/2002 | Fleischer et al. |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0138650 A1 | 9/2002 | Yamamoto et al. |
| 2003/0009602 A1 | 1/2003 | Jacobs |
| 2003/0013449 A1 | 1/2003 | Hose |
| 2003/0016804 A1 | 1/2003 | Sheha |
| 2003/0037163 A1 | 2/2003 | Kitada |
| 2003/0040272 A1 | 2/2003 | Lelievre |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119521 A1 | 6/2003 | Tipnis |
| 2003/0119528 A1 | 6/2003 | Pew |
| 2003/0137961 A1 | 7/2003 | Tsirtsis |
| 2003/0153340 A1 | 8/2003 | Crockett |
| 2003/0153341 A1 | 8/2003 | Crocket |
| 2003/0153342 A1 | 8/2003 | Crockett |
| 2003/0153343 A1 | 8/2003 | Crockett |

| | | |
|---|---|---|
| 2003/0161298 A1 | 8/2003 | Bergman |
| 2003/0196105 A1 | 10/2003 | Fineburg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0044623 A1 | 3/2004 | Wake |
| 2004/0047461 A1 | 3/2004 | Weisman et al. |
| 2004/0068724 A1 | 4/2004 | Gardner |
| 2004/0098497 A1 | 5/2004 | Banet |
| 2004/0132465 A1 | 7/2004 | Mattila |
| 2004/0185875 A1 | 9/2004 | Diacakis et al. |
| 2004/0198332 A1 | 10/2004 | Lundsgaard |
| 2004/0205151 A1 | 10/2004 | Sprigg |
| 2004/0229632 A1 | 11/2004 | Flynn |
| 2004/0242238 A1 | 12/2004 | Wang |
| 2005/0028034 A1 | 2/2005 | Gantman |
| 2005/0039178 A1 | 2/2005 | Marolia |
| 2005/0041578 A1 | 2/2005 | Huotari |
| 2005/0086467 A1 | 4/2005 | Asokan |
| 2005/0090236 A1 | 4/2005 | Schwinke |
| 2005/0112030 A1 | 5/2005 | Gaus |
| 2005/0134504 A1 | 6/2005 | Harwood |
| 2005/0209995 A1 | 9/2005 | Aksu |
| 2005/0259675 A1 | 11/2005 | Tuohino |
| 2005/0271029 A1 | 12/2005 | Iffland |
| 2006/0008065 A1 | 1/2006 | Longman et al. |
| 2006/0023747 A1 | 2/2006 | Koren et al. |
| 2006/0053225 A1 | 3/2006 | Poikselka |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Fok |
| 2007/0026854 A1 | 2/2007 | Nath |
| 2007/0030539 A1 | 2/2007 | Nath |

FOREIGN PATENT DOCUMENTS

| | | |
|---|---|---|
| WO | 9928848 | 12/1999 |
| WO | 0146666 | 11/2001 |
| WO | WO2005/051033 | 6/2005 |
| WO | WO2007027166 | 3/2007 |

OTHER PUBLICATIONS

Qualcomm CDMA Technologies, LBS Control Plane/User Plane Overview - 80-VD378-1NP B, 2006, pp. 1-36.

Bhalla et al, Telus, Technology Strategy - LBS Roaming Summit, Sep. 19, 2006.

Alfredo Aguirre, Iusacell, First and Only Carrier in Mexico with a 3G CDMA Network, 2007.

Mike McMullen, Sprint, LBS Roaming Summit, Sep. 19, 2006.

Andrew Yeow, BCE, LBS Roaming Summit, Sep. 19, 2006, pp. 1-8.

Nars Haran, U.S. Cellular, Packet Data - Roaming and LBS Overview, Nov. 2, 2007, pp. 1-15.

Qualcomm CDMA Technologies, LBS Control Plane Roaming - 80-VD377-1NP A, 2006, pp. 1-10.

Qualcomm CDMA Technologies, MS Resident User Plane LBS Roaming - 80-VC718-1 E, 2006, pp. 1-37.

3$^{rd}$ Generation Partnership Project 2, Position Determination Service Standard for Dual Mode Spread Spectrum Systems, Feb. 16, 2001, pp. i-X, 1-1 - 1-5, 2-1 - 2-2, 3-1 - 3-51, 4-1 - 4-66, A-1 - A-2, B-1 - B-2, C-1 - C-2, D-1 - D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

* cited by examiner

Diagram showing a LCS request generating a Presence response.

LOCATION DERIVED PRESENCE INFORMATION

This application claims priority from co-pending U.S. Appl. No. 60/367,708, entitled "Location Derived Presence Information", filed Mar. 28, 2002, by Hines et al., the entirety of which is explicitly incorporated herein by reference.

BACKGROUND OF THE INVENTION

1. Field of the Invention

This invention relates generally to wireless communication carriers. More particularly, it relates to location and presence-based services for the wireless industry.

2. Background of Related Art

The term "presence" in the wireless world typically relates to a network answer to the simple question "Are you available?". For instance, if a subscriber's wireless device is turned off, they would not be available. However, if a subscriber's wireless device is turned on, and in communication with a carrier, the carrier would most likely be able to indicate to a relevant request that the subscriber is available and thus "present". The functions and use of presence information is well known in the art.

Location information regarding subscribers is increasingly becoming available in a wireless network. This is particularly true in systems that comply with E-9-1-1 requirements. Location information relates to absolute coordinates of a wireless device.

Both Location and Presence services are message intensive on telecom networks. Message reduction in general is desirable, both to allow increased capacity in a wireless network, as well as to improve reliability of the system by reducing the number of messages.

SUMMARY OF THE INVENTION

In accordance with the principles of the present invention, a method and apparatus provides presence information regarding a wireless device. A request for location information regarding a wireless device is received. Presence information regarding the wireless device is provided in response to the receipt of the request for location information regarding the wireless device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
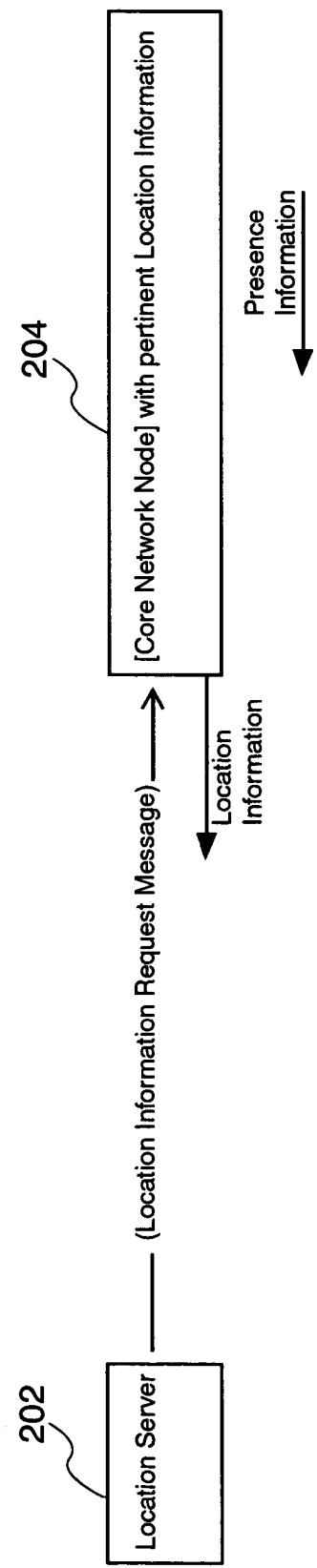
FIG. 1 shows generally a location request.

The present invention recognizes the duplicity of information provided by location and presence services, and reduces the number of messages required in networks where both Location and Presence services are deployed.

To reduce the amount of messaging within the core network, the present invention retrieves presence data from messages intended to provide location information. Thus, information determined in a Location service scheme is utilized to provide a presence service as well.

In accordance with the present invention, a Location Server requests mobile subscriber (MS) information from a Core Network (CN) Node (i.e. HLR, MSC, etc.) that can be used in determining the Location of the MS. In most cases the messages used for requesting Location and Presence services are the same. The proposed concept uses a single message to aggregate information for two services, specifically Location and Presence.

Entirely new revenue streams may be realized by carriers through a location services solution, e.g., the Xypoint Location Platform (XLP) available from Telecommunication Systems, Inc. in Annapolis, Md. The XLP preferably integrates three centers that wireless carriers should have to effectively gather, manage, protect and distribute wireless data, and ultimately, collect revenue from subscribers for doing so. With the ability to offer the full array of location-based services-everything from enhanced 411 services, to location-based games, child tracking and location-specific advertising-carriers can add a whole new profit center to their business models, including generating non-subscriber revenue. The three module centers in the exemplary XLP used in the disclosed embodiments are a Location Center, a Presence Center, and a Privacy Center.

Location Center—Determines the location of mobile users from the wireless network and provides a single point of access for location-based applications. The XLP Location Center preferably includes a mobile positioning center (MPC), e.g., a fully J-STD-036-compliant Mobile Positioning Center (MPC) to deliver E911 Phase I services.

Presence Center—Enhances an application's ability to communicate with the mobile user by determining the state and availability of the mobile user to receive a text message, WAP push or incoming call. Presence enables applications such as instant messaging and allows for options such as determining who on your "buddy list," is available.

Privacy Center—Ensures that carriers and mobile subscribers are firmly in control of their data. It allows users to choose exactly which location and presence information to make available to specific vendors or other users.

The XLP is preferably implemented as either a fully turn-key (in-house), hosted or hybrid solution, allowing carriers to pick and choose the best solution to meet their business needs. Whether a carrier opts for in-house or hosted services, the XLP provides a highly available and scalable distributed network architecture. The XLP also offers carriers the flexibility to choose the position determining entity (PDE) that will best meet their current needs while also minimizing over-lapping integration of applications and services.

The MPC technology integrated within the XLP's Location Center has been deployed to support E911 Phase I services. The Xypoint Location Platform available from Tele-Communication Systems, Inc. has been integrated with well over 100 commercially available switches-including Lucent, Nortel, Motorola and Ericsson. The XLP is preferably network independent and supports all major wireless interfaces, including GSM, CDMA, TDMA and AMPS.

FIG. 1 shows generally a location request to a core network node containing pertinent location information, resulting not only in a return of location information, but also in the spawning of presence information.

In particular, as shown in FIG. 1, a location server 202 requests location information regarding a particular mobile subscriber (MS) from a core network node 204, e.g., from a Mobile Switch Center (MSC). Requested information regarding a particular wireless device (MS) may include, e.g., attach, detach, and location area update. The location server 202 may also request information regarding the wireless device such as attach, detach and/or location area update from a Packet Date Node (e.g., SGSN, GGSN, or PDSN).

Typically, location information regarding a particular wireless device is requested of a home location register (HLR). In accordance with the principles of the present invention, the home location register can also serve as a basis for presence services. Exemplary presence services may include, e.g., the state and/or status of a subscriber.

Importantly, in accordance with the present invention, information relating to presence is spawned or triggered by a location request. The presence information may or may not be returned along with the location information, but preferably is included within the message (or messages) containing location information.

Figure 2:
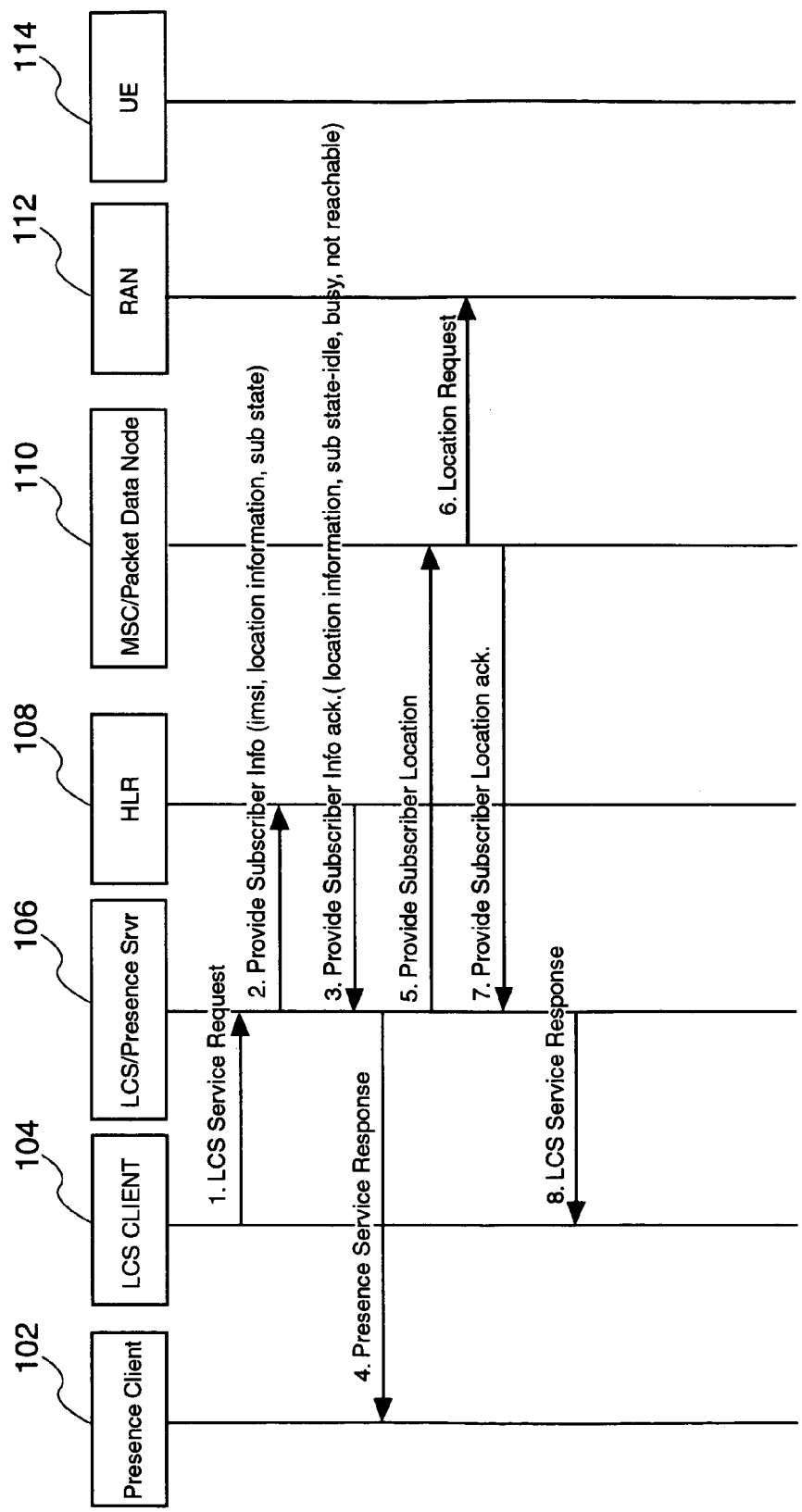
FIG. 2 shows a LoCation Services (LCS) request generating a presence response, in accordance with the principles of the present invention.

FIG. 2 shows an exemplary LoCation Services (LCS) request generating a response including presence information in more detail, in accordance with the principles of the present invention.

In particular, FIG. 2 shows exemplary messaging between a presence client 102, a location service client 104, a location/presence server 106, a home location register (HLR) 108, a core network node such as an MSC or packet data node 110, and a radio access network (RAN) 112.

In the exemplary embodiment, the messaging cycle is initiated (shown in Step 1) by a location services client 104, that transmits a location request message to a location services/presence server 106 in the relevant carrier's network.

In step 2, a Provide Subscriber Info message is transmitted by the location services/presence services server 106 to the home location register 108 (or other node containing location and/or presence information). The Provide Subscriber Info message can request location information and/or subscriber state. In this use case, location information regarding a particular subscriber is being requested, and within the same message, presence information such as subscriber state may also be requested. Requested presence information can include, e.g., idle, bust, not reachable, etc.

In step 3, the network node containing the location and presence information (e.g., the Home Location Register (HLR) 108) provides the requested location information and presence information (e.g., idle, bust, not reachable, etc.) back to the location services/presence services server 106.

In step 4, the location services/presence services server 106 uses the returned subscriber info, and transmits a Presence Service Response to a relevant presence application, e.g., a presence client 102 depicted in FIG. 2.

This 'freebie' presence information is an important aspect of the present invention. For instance, an entirely separate presence application 102 may register with a particular carrier, perhaps paying suitable fees, for the right to receive presence information for those wireless devices that have had location information returned. This avoids the need for the presence client 102 to separately request presence information regarding that particular wireless device.

In step 5, the location services/presence services server 106 requests updated location information of the wireless network, i.e., sending a request for current location information from a relevant network node (e.g., the MSC or packet data node 110).

The MSC, packet data node 110, etc. may determine a current location of the relevant wireless device using any suitable location technology, e.g., using a global positioning satellite (GPS) system, using triangulation, using angle of arrival, etc.

As part of the determination of a current location of the wireless device, as shown in step 6, the location request may be forwarded to a Radio Access Network. This would be necessary for certain locating technologies (e.g., for triangulation, angle of arrival, etc.). If a global positioning satellite system is utilized, the location request may be forwarded to a suitable GPS application in the wireless network that receives GPS location information regarding a relevant wireless device.

In step 7, a response to the update location information request is transmitted to the location services/presence services server 106. (The updated location information may also be forwarded to the HLR (not shown in FIG. 2) to update the current location of the relevant wireless device).

Lastly, in step 8, the location information initially requested by the LCS application or client 104 is returned. This returned information ideally includes current location information freshly obtained from the MSC 110 or other network node, but may instead be cached location information stored in the HLR 108 if the location information is not returned within a sufficient time window (e.g., causing a timeout).

The present invention provides benefits such as reducing core network messaging traffic, providing better XLP performance, and allowing the use of cached presence data relating to wireless devices, allowing quick and easy access to presence data.

While the invention has been described with reference to the exemplary embodiments thereof, those skilled in the art will be able to make various modifications to the described embodiments of the invention without departing from the true spirit and scope of the invention.

What is claimed is:

1. A method of providing presence information regarding a wireless device, comprising:
   receiving a request for location information regarding a wireless device; and
   providing presence information regarding said wireless device in response to said receipt of said request for location information regarding said wireless device.

2. The method of providing presence information regarding a wireless device according to claim 1, wherein said presence information comprises at least one of the following:
   a state of said wireless device; and
   a status of said wireless device.

3. The method of providing presence information regarding a wireless device according to claim 1, wherein:
   said presence information is provided to a presence application separate from an application requesting said location information.

4. The method of providing presence information regarding a wireless device according to claim 1, wherein:
   said location information and said presence information are maintained in a home location register.

5. The method of providing presence information regarding a wireless device according to claim 1, further comprising:
   requesting current location information regarding said wireless device from a core network node.

6. The method of providing presence information regarding a wireless device according to claim 5, wherein:
   said core network node is a message service center.

7. The method of providing presence information regarding a wireless device according to claim 1, further comprising:
   obtaining last known location information regarding said wireless device to return as said location information.

8. The method of providing presence information regarding a wireless device according to claim 1, wherein:
   said location information is obtained from cached memory.

9. The method of providing presence information regarding a wireless device according to claim 1, wherein:
said location information is obtained from a radio access network.

10. The method of providing presence information regarding a wireless device according to claim 1, wherein:
said location information is obtained from a global positioning satellite (GPS) system.

11. Apparatus for providing presence information regarding a wireless device, comprising:
means for receiving a request for location information regarding a wireless device; and
means for providing presence information regarding said wireless device in response to said receipt of said request for location information regarding said wireless device.

12. The apparatus for providing presence information regarding a wireless device according to claim 11, wherein said presence information comprises at least one of the following:
a state of said wireless device; and
a status of said wireless device.

13. The apparatus for providing presence information regarding a wireless device according to claim 11, wherein:
said means for providing presence information provides said presence information to a presence application separate from an application requesting said location information.

14. The apparatus for providing presence information regarding a wireless device according to claim 11, wherein:
said location information and said presence information are maintained in a home location register.

15. The apparatus for providing presence information regarding a wireless device according to claim 11, further comprising:
means for requesting current location information regarding said wireless device from a core network node.

16. The apparatus for providing presence information regarding a wireless device according to claim 15, wherein:
said core network node is a message service center.

17. The apparatus for providing presence information regarding a wireless device according to claim 11, further comprising:
means for obtaining last known location information regarding said wireless device to return as said location information.

18. The apparatus for providing presence information regarding a wireless device according to claim 11, further comprising:
means for obtaining location information from cached memory.

19. The apparatus for providing presence information regarding a wireless device according to claim 11, further comprising:
means for obtaining location information from a radio access network.

20. The apparatus for providing presence information regarding a wireless device according to claim 11, further comprising:
means for obtaining location information from a global positioning satellite (GPS) system.

* * * * *